Patented Mar. 2, 1943

2,312,685

UNITED STATES PATENT OFFICE 2,312,685

TERPENE DERIVATIVE

Joseph N. Borglin, Wilmington, Del., assignor to Hercules Powder Company, Wilmington, Del., a corporation of Delaware No Drawing. Application April 9, 1941, Serial No. 387,677

12 Claims. (Cl. 260—489)

This invention relates to new terpene compounds and a method for their formation. More particularly, it relates to new hydroxyl-containing terpene esters and to a method for their preparation from terpinolene.

In accordance with this invention, the terpene hydrocarbon or terpene fraction boiling within the range between about 185° C. and 195° C. and having a specific gravity between about 0.863 and about 0.873 at 15.6° C./15.6° C. is brought into intimate contact with oxygen and with an organic carboxylic acid and is reacted therewith until a hydroxyl-containing terpene ester is formed. This reaction may be conducted under pressure if desired, and it may be facilitated by the aid of catalysts if desired. By the reaction in accordance with this invention, there is formed a mixture of oily water-insoluble hydroxyl-containing terpene esters and water-soluble hydroxyl-containing terpene esters. Both products are characterized by ester linkages and by hydroxyl groups upon both secondary and tertiary carbon atoms of the terpenic portion of the molecule. The two types of product mentioned may be separated and recovered from the reaction mixture.

The terpene hydrocarbon or terpene fraction reacted with alcohol and oxygen in the method in accordance with this invention will boil within the range between about 185° C. and about 195° C. at 760 mm. pressure, and has a specific gravity within the range of about 0.863 to about 0.873 (15.6° C./15.6° C.). Preferably, for greatest efficiency, it will boil within the range of about 187° C to about 191° C., and have a specific gravity within the range of about 0.865 to about 0.870 (15.6° C./15.6° C.). It is believed to be terpinolene, although this identification is not positive, due to conflicting physical constants given for terpinolene in the literature. Hereinafter, when the term "terpinolene" is used, it will be understood that a terpene hydrocarbon having a boiling range of about 185° C. to about 195° C. and a specific gravity within the range of about 0.863 to about 0.873 (15.6° C./15.6° C.) is meant. Commercial terpene cuts of the character hereinabove described or rich (above about 40%) in terpinolene obtained, for example, from wood turpentine, isomerized turpentine, or as by-products in camphor and other terpene syntheses, are quite suitable.

Suitable organic carboxylic acids in the process according to this invention are, for example, such aliphatic acids as formic acid, acetic acid, propionic acid, butyric acid, valeric acid, caprillic acid, glycolic acid, tartaric acid, lactic acid, citric acid, malic acid, succinic acid, maleic acid, nitropropionic acid, furoic acid, tetrahydrofuroic acid; such cycloaliphatic acids as the naphthenic acids and such aromatic acids as benzoic acid, cumic, salicylic acid, phthalic acid, terephthalic acid, and the like.

The oxygen utilized in the reaction according to this invention may be provided in the form of any gas containing free oxygen. Pure oxygen may be utilized, if desired. However, oxygen is most conveniently provided in the ordinary atmospheric form.

The reaction in accordance with this invention is brought about by mixing the terpinolene and the carboxylic acid utilized and bringing this mixture into intimate contact with oxygen. This may be accomplished by vigorous agitation of the liquid reactants to provide a constant renewal of surface exposed to the oxygen. Preferably, air or oxygen is whipped up into the liquid or is bubbled through the liquid reactants. The reaction is facilitated by providing the oxygen under superatmospheric pressure. Thus, air at any convenient pressure may supply the oxygen, the speed of the reaction increasing as the pressure is increased. Pressures up to several thousand atmospheres may be utilized, the actual pressure being dictated largely by convenience.

The time required to form hydroxyl-containing terpinolene esters by the method in accordance with this invention varies considerably with the conditions of reaction utilized. The conditions of oxygen contact largely determine the minimum time of reaction. Where the liquid reactants are merely agitated in air, or where air is slowly bubbled through a large mass of liquid reactants, the reaction time will usually be long, and may be from about 8 hours to in excess of two weeks. In most cases, substantial completion of the reaction will be attained within a period from about 8 hours to about 150 hours under atmospheric pressure. At superatmospheric pressure, i. e., at high oxygen pressures, the reaction will be much more rapid and in most cases will be substantially completed in from about 4 to about 20 hours.

The reaction may be conducted at any temperature in the range between 0° C. and about 200° C., or between 0° C. and 100° C. where water-soluble products are desired. Preferably the temperature will be maintained between about 15° C. and about 60° C. as only in this range are good yields of water-soluble products obtained in a reasonable time. The reaction with terpinolene is exothermic. Thus, where oxygen is provided under conditions promoting rapid reaction, the temperature of the reaction mixture may rise rapidly. It is usually desirable to provide external cooling in such cases to control the temperature in the desired range.

Usually, the reaction mixture will consist essentially of the terpinolene and the carboxylic acid reacted with the acid in excess of that expected to enter into the reaction. However, inert diluents such as benzene, toluene, acetone, methylethyl ketone, ethyl acetate, petroleum ether, and the like may be present if desired.

The oxidation-esterification process in accordance with this invention may be conducted under substantially anhydrous conditions, or it may be conducted in the presence of water. Reaction in the presence of water is preferred where a maximum yield of water-soluble products is desired. In general, the effect of water is to increase the ratio of hydroxyl groups to ester groups in the product and to increase the water-solubility of the products. The quantity of water may vary widely according to the type of product desired, and may be as much as ten times the weight of the terpene utilized. It will be appreciated that the ratio of hydroxyl groups to ester groups depends to some extent upon the ratio of water to carboxylic acid in the reaction mixture. Usually, the concentration of the acid on the basis of the water present will be above about 2%.

The reaction may be facilitated if desired by the use of catalysts. Oxidation of oxygen-carrier catalysts which operate by reason of active surfaces such as activated carbon, activated alumina, flake aluminum, iron powder, and the like; or which contain elements which readily undergo reversible changes in valence such as, for example, potassium permanganate, selenium oxide, cerium sulphate, vanadium sulphate, cobalt naphthanate, manganese linoleate, lead naphthanate, lead linoleate, lead mercaptides, and the like; or hydrohalides of basic nitrogen compounds such as halides of ammonia or amines, for example, ammonium chloride, ammonium bromide, aniline hydrochloride, pyridene hydrochloride, triethanolamine hydrochloride, methylamine hydrochloride, and the like may be used. Such catalysts may be utilized under any of the conditions of reaction previously mentioned. The quantity of catalyst utilized may be varied widely. However, a quantity between about 0.1% and about 10% by weight of the terpinolene present is usually ample.

The reaction in accordance with this invention will usually be conducted until substantially no more oxygen is absorbed by the reacting mixture. Operation may be by batches or, where the conditions bring about rapid reaction, operation may be continuous. The reaction product will be a mixture containing hydroxy terpene esters of an oily nature insoluble in water and hydroxy terpene esters of a water-soluble nature. These products may be recovered from the reaction mixture by adding water thereto, if little or none is present, and separating the water layer and the oily layer.

The recovery of the water-soluble products is best accomplished by evaporation of the water from the water layer at a high vacuum and relatively low temperatures. Where the carboxylic acid utilized is volatile, excess thereof will usually evaporate with the water. Non-volatile acids may be removed by extraction with water-immiscible solvents such as ethyl acetate, ether, propyl acetate, benzene, and the like prior to this evaporation step. Upon evaporation of the water and any volatile associated materials, and removal of excess acid, a neutral syrup which is believed to be a mixture of several hydroxy terpene esters is obtained. When this syrup is allowed to stand over a period of some days, a crystalline hydroxy ester will usually form and separate out. The separation of the crystalline product is greatly facilitated by seeding. It occurs most readily when the carboxylic acid used is a lower aliphatic acid (i. e., six or less carbon atoms), especially a lower fatty acid. Both crystalline and non-crystalline products have a slight odor suggestive of caramel. They are colorless to a light amber and have a somewhat bitter taste.

Water-insoluble hydroxy esters are recovered by removing volatile materials from the oily layer under vacuum, the hydroxy esters remaining as the least volatile material. Non-volatile acids present may be removed by extraction with mild aqueous alkali such as a dilute sodium carbonate solution. The product is a light neutral oily material when excess acid reactant has been efficiently removed.

The water-soluble product and the water-insoluble product obtained by the method in accordance with this invention are terpene esters of the carboxylic acid utilized having a hydroxyl upon the terpene portion of the molecules. It is a characteristic of the compounds that they contain a hydroxyl upon a tertiary carbon atom of the terpenic structure, and in addition, in the case of the water-soluble products, they will usually contain a hydroxyl upon a secondary carbon atom of the terpenic structure. The water-soluble product in general has a higher hydroxyl content than the water-insoluble product. The products in accordance with this invention may be modified by heating in the presence of a strong, inorganic acid, such as sulphuric acid, sodium acid sulphate, phosphoric acid, nitric acid, hydrochloric acid, etc. or in the presence of dehydrating surface active agents such as, activated silica gel, activated alumina, and the like, whereupon products of reduced hydroxyl content are obtained by chemical dehydration. Thus, the water-soluble hydroxy esters may be dehydrated to water-insoluble hydroxy esters or dehydrated further to more unsaturated esters having no hydroxy groups.

Both types of products are believed to consist of a mixture of rather similar compounds which differ from each other in part by degree of oxidation esterification and in part by isomerization. It is believed that the addition of hydroxyl groups and ester groups is not entirely uniform, so that several isomers may be obtained from the same terpenes. The exact mechanism of the reaction according to this invention is not known. The reactions involve increase in molecular weight of the terpene, and are, therefore, of the nature of addition reactions. Unlike more drastic oxidation procedures, no appreciable scission or cracking of the terpinolene takes place, although isomerization and/or decyclicization of the terpenic structure may occur. It is believed the following equations express the nature of the reactions which occur when terpinolene is reacted with oxygen and, for example, acetic acid:

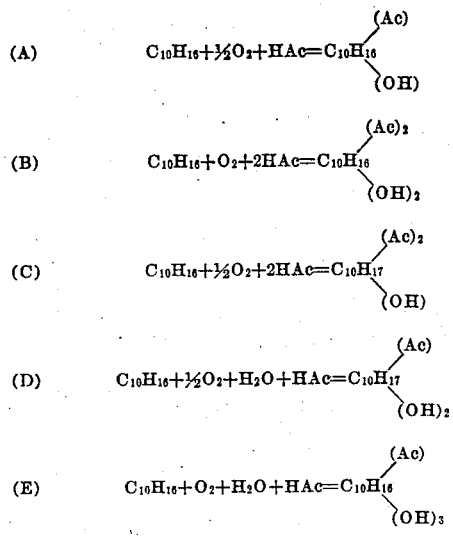

It will be appreciated that the above equations represent an hypothesis to which this invention is not to be limited.

The process and product in accordance with this invention are illustrated by specific embodiments thereof in the following examples.

*Example 1*

A mixture consisting of 2000 milliliters of terpinolene, 750 milliliters of water, 25 milliliters of acetic acid, and 2 grams of sodium lauryl sulphate as a wetting agent to improve contact was agitated for 194 hours while a slow stream of air was bubbled therethrough. The mixture rose in temperature from an initial 25° C. to 46° C. and gradually dropped in temperature. At the end of this period an additional 100 milliliters of water were added and the reaction continued for an additional 90 hours. Twenty-five milliliters of acetic acid and 200 milliliters of water were then added and the reaction conducted for 135 hours. The resulting reaction mixture was then permitted to separate into layers, and an oily layer of 1275 milliliters and an aqueous layer of 1760 milliliters were drawn off. It will be noted that the aqueous portion increased 760 milliliters, while the oily layer decreased 725 milliliters as a result of the reaction which took place. The aqueous layer was evaporated under vacuum over a steam bath and a yield of 1133 grams of substantially neutral water-soluble product was obtained. This product showed the following properties upon analysis:

| | |
|---|---|
| Saponification number | 76 |
| $d$ 15.6/15.6 | 1.1006 |
| Secondary alcohol analysis____Percent__ | 5.3 |
| Tertiary alcohol analysis_____do____ | 477 |

The analyses for alcohols were calculated on the basis of $C_{10}H_{17}OH$ monohydric alcohols. The high tertiary value obtained shows that there is more than one tertiary substituent per molecule, i. e., that the product is a tertiary polyhydric alcohol with partial esterification by acetic acid. The tertiary alcohol value includes tertiary acetic groups removed by the procedure of the analysis.

The oily layer was fractionated by vacuum distillation at 70 mm. pressure into two distilled fractions, and a distillation residue having the following characteristics analyzed:

| | Fraction No. 1 | Fraction No. 2 | Residue |
|---|---|---|---|
| Yield_____per cent__ | 27.5 | 17.7 | 47.5 |
| Saponification number__do____ | 22.5 | 7.5 | 20 |
| $d$ 15.6/15.6_____do____ | .8645 | .8661 | .9719 |
| Secondary alcohol_____do____ | 0.5 | 3.0 | 11.5 |
| Tertiary alcohol_____do____ | 27.5 | 17.7 | 47.5 |

The analyses indicate the presence of appreciable quantities of tertiary and secondary alcohols, partially acetylated.

*Example 2*

A mixture consisting of 2000 milliliters of a terpinolene cut (boiling range, 185° C. to 195° C.) obtained by processing of pine wood, 750 milliliters of water, and 25 milliliters of acetic acid was agitated while a slow stream of air was passed therethrough. The temperature rose from 25° C. to 44° C. and thereafter dropped slowly. This treatment was continued for 180 hours, at which time 100 milliliters of water were added. The reaction was then continued an additional 90 hours, and 25 milliliters of acetic acid and 200 milliliters of water were added. The reaction was then continued for 135 hours more. The resulting mixture was then permitted to separate into two layers. The oily layer of 1030 milliliters and the water layer of 1910 milliliters resulting were separated by decantation. It will be noted that the aqueous layer had increased 835 milliliters, while the oily layer had decreased 1090 milliliters.

The aqueous layer was evaporated under reduced pressure and at a temperature of about 60° C. to obtain 1106 grams of water-soluble product. This product had the following analysis:

| | |
|---|---|
| Saponification number | 63 |
| $d$ 15.6/15.6 | 1.102 |
| Secondary alcohol analysis____Percent__ | 11.0 |
| Tertiary alcohol analysis_____do____ | 295 |

The water-soluble product was permitted to stand for two weeks at room temperature, to form a white crystalline product. The crystals were removed by filtration, 218 grams of crystals being obtained from 940 grams of the water-soluble product. The crystals obtained had the following properties:

| | |
|---|---|
| Melting point | 130–135° C. |
| Sign of double refraction | + |
| 2 V | 30–40° |
| Indices of refraction: | |
|   Low Ca | 1.505 |
|   High Ca | 1.57–1.59 |
| Orientation of optic plane | Inclined about 35° from predominant face; parallel to long direction of crystal. |
| Crystal habit | 6 - sided crystals. Terminal angle 135°. Parallel extinction. |

The oily layer obtained was fractionated by distillation at a pressure of about 60 mm. at a bath temperature of 100° C. In this manner two distillation fractions and a distillation residue having the following characteristics were obtained:

|  | Fraction No. 1 | Fraction No. 2 | Residue |
|---|---|---|---|
| Volume of fraction | 300 cc. | 190 cc. | 493 cc. |
| Saponification number | 6.0 | 8.5 | 24 |
| d 15.6/15.6 | .8651 | .8706 | .9685 |
| Secondary alcohol | 2.0 | 2.0 | 15.3 |
| Tertiary alcohol | 4.9 | 7.0 | 28.4 |

These fractions contained appreciable quantities of secondary and tertiary alcohols partially acetylated.

*Example 3*

A mixture consisting of 500 milliliters of a terpinolene cut (boiling range, 185° C. to 195° C.) obtained from pine wood, 500 milliliters of water, and 50 milliliters of formic acid was agitated for 150 hours while a slow stream of air was passed therethrough. The temperature rose from an initial 25° C. to 45° C. and dropped slowly thereafter. The resulting reaction mixture was permitted to separate into two layers. A water layer of 630 milliliters and an oily layer of 430 milliliters were recovered by decantation. Evaporation of the water layer under a high vacuum resulted in a yield of 57 grams of water-soluble syrupy product consisting of partial formates of terpene polyhydric alcohols.

*Example 4*

A mixture consisting of 1000 milliliters of a terpinolene cut obtained from pine wood (boiling range, 5-95% at 179° C. to 191° C.; d 15.6/15.6, 0.8622), 1000 milliliters of acetic acid, and 7 grams of activated carbon was agitated 90 hours at a temperature varying between 22° C. and 35° C. while a slow stream of air was passed therethrough. The resulting reaction product was then filtered to remove the activated carbon utilized as catalyst. Separation of water-soluble and water-insoluble products was then achieved by adding 700 milliliters of water, shaking the resulting mixture thoroughly, and allowing it to separate into two layers. In this manner, an aqueous layer of 1950 milliliters and an oily layer of 755 milliliters were obtained.

The aqueous layer was evaporated under vacuum at a temperature of about 60° C. to yield 255 grams of water-soluble product having the following analysis:

Acid number _____ 54.7
Saponification number _____ 212.5
Ester number _____ 157.8
Hydroxyl value (Zerewitinoff) __per cent__ 12.8

Free acid remained in this product as analyzed. It consisted largely of terpene hydroxy acetates.

*Example 5*

A mixture consisting of 500 milliliters of propionic acid, 500 milliliters of a terpinolene cut (boiling range from 185° C. to 195° C.) and 3.5 grams of activated carbon was agitated 90 hours at a temperature varying between 25° C. and 32° C. while a slow stream of air was passed therethrough. The resulting mass was filtered to remove the activated carbon utilized as catalyst, and the filtrate was then diluted with 800 milliliters of water. The two layers forming were separated by decantation. The aqueous layer was evaporated under vacuum at a temperature of about 70° C. to obtain 121 grams of water-soluble product which analyzed as follows:

Saponification number _____ 281
$n^{20}_D$ _____ 1.4790
Hydroxyl (Zerewitinoff) _____per cent__ 14.4

This product consisted essentially of terpene hydroxy propionates. It crystallized partially on standing for one month.

The oily layer was steam distilled to obtain 235 milliliters of distillate and 122 grams of residue. The distillate consisted in a considerable proportion of readily volatile terpinolenes and excess propionic acid, the residue representing hydroxy esters. This residue analyzed as follows:

Saponification number _____ 153.7
$n^{20}_D$ _____ 1.5014
Hydroxyl (Zerewitinoff) _____per cent__ 10.9

The product consisted largely of terpene hydroxy propionates which, however, were not as highly substituted as those of the water-soluble product.

*Example 6*

A mixture consisting of 500 milliliters of formic acid, 500 milliliters of the terpinolene cut used in the previous example, and 3.5 grams of activated carbon was agitated for 90 hours at a temperature varying between about 25 and 33° C., while passing a slow stream of air therethrough. The resulting reaction product was filtered and diluted with water. Two layers were permitted to separate, and an oily layer and an aqueous layer were recovered by decantation. Evaporation of the aqueous layer under vacuum at a temperature of 45° C. to 60° C. gave a yield of 29 grams of water-soluble terpene hydroxy formates.

The water-soluble products and the mixture of water-soluble and water-insoluble products made according to this invention are useful as solvents, furnishing excellent coupling agents between water-soluble and water-insoluble material of an organic nature. The water-insoluble products are useful as solvents in paints and cellulosic lacquers. The products also find use as a detergent aid and in flotation. They may be included in insecticides to improve the activity of toxic agents and to permit the inclusion of toxic agents of low water-solubility in aqueous insecticides.

Tertiary alcohol content as used herein is determined by dehydration under the influence of sodium acid sulphate as a catalyst, measuring the water and any alcohol evolved as indicative of tertiary hydroxyl. Secondary alcohol content is determined by acetylation of the dehydrated residue from the tertiary alcohol determination, followed by saponification, then determining the saponification number in the usual manner and calculating the secondary alcohol content therefrom. Results expressed as alcohol content are calculated on the monohydric alcohol basis assuming the formula $C_{10}H_{17}OH$.

It will be understood that the details and examples hereinbefore set forth are illustrative only, and that the invention as broadly described and claimed is in no way limited thereby.

What I claim and desire to protect by Letters Patent is:

1. A method which comprises subjecting a mixture comprising terpinolene and an organic carboxylic acid to reaction with a gas containing free oxygen as the only reactive ingredient until a hydroxylated terpene ester is produced.

2. A method which comprises reacting a mixture containing terpinolene and an organic carboxylic acid with free oxygen, the free oxygen being contained in a gas free of other reactive ingredients and under superatmospheric pressure until a hydroxylated terpene ester is produced.

3. A method which comprises subjecting a mixture comprising terpinolene, an organic carboxylic acid, and an oxidation catalyst to reaction with a gas containing free oxygen as the only reactive ingredient until a hydroxylated terpene ester is produced.

4. A method which comprises subjecting a mixture comprising terpinolene, an organic carboxylic acid, and an oxidation catalyst to reaction with a gas containing free oxygen as the only reactive ingredient until a water-soluble hydroxylated terpene ester is produced, and recovering the water-soluble terpene hydroxy ester.

5. A method which comprises subjecting a mixture comprising terpinolene, an organic carboxylic acid, and water to reaction with a gas containing free oxygen as the only reactive ingredient until a hydroxylated terpene ester is produced.

6. A method which comprises subjecting a mixture comprising terpinolene, an organic carboxylic acid, and water to reaction with a gas containing free oxygen as the only reactive ingredient until a water-soluble hydroxylated terpene ester is produced, and recovering the said water-soluble compound.

7. A method which comprises subjecting a mixture comprising terpinolene and an organic carboxylic acid to reaction with oxygen in the free gaseous form at temperatures between 0° C. and about 100° C. until a freely water-soluble hydroxylated terpene ester is produced, and recovering the said ester.

8. A method which comprises subjecting a mixture comprising terpinolene, an organic carboxylic acid, and water to reaction with air under superatmospheric pressure in the presence of an oxidation catalyst until a water-soluble hydroxylated terpene ester is produced, and recovering the said water-soluble hydroxylated terpene ester.

9. Water-soluble hydroxylated carboxylic acid terpene esters formed by reaction of terpinolene with oxygen and a carboxylic acid, the esters being characterized by at least one tertiary terpene hydroxyl, by the property of losing hydroxyl on heating with sulfuric acid, and by being capable of concentration to a syrup which upon standing deposits colorless crystals of terpene hydroxy ester, said hydroxylated terpene esters being prepared by the method defined in claim 1.

10. Water-soluble hydroxylated formic acid terpene esters formed by reaction of terpinolene with oxygen and formic acid, the esters being characterized by at least one tertiary terpene hydroxyl, by the property of losing hydroxyl on heating with sulfuric acid, and by being capable of concentration to a syrup which upon standing deposits colorless crystals of terpene hydroxy ester, said hydroxylated terpene esters being formed by reacting an unsaturated terpene and formic acid according to the process of claim 1.

11. Water-soluble hydroxylated acetic acid terpene esters formed by reaction of terpinolene with oxygen and acetic acid, the esters being characterized by at least one tertiary terpene hydroxyl, by the property of losing hydroxyl on heating with sulfuric acid, and by being capable of concentration to a syrup which upon standing deposits colorless crystals of terpene hydroxy ester, said hydroxylated terpene esters being formed by reacting an unsaturated terpene and acetic acid according to the process of claim 1.

12. Water-soluble hydroxylated propionic acid terpene esters formed by reaction of terpinolene with oxygen and propionic acid, the esters being characterized by at least one tertiary terpene hydroxyl, by the property of losing hydroxyl on heating with sulfuric acid, and by being capable of concentration to a syrup which upon standing deposits colorless crystals of terpene hydroxy ester, said hydroxylated terpene esters being formed by reacting an unsaturated terpene and propionic acid according to the process of claim 1.

JOSEPH N. BORGLIN.